United States Patent [19]

Leonard et al.

[11] Patent Number: 5,509,438
[45] Date of Patent: Apr. 23, 1996

[54] AIR VALVE ADAPTER

[75] Inventors: George H. Leonard, Darien, Conn.; Martin T. Connolly, New York, N.Y.

[73] Assignee: Spinergy Inc., Wilton, Conn.

[21] Appl. No.: 254,649

[22] Filed: Jun. 8, 1994

[51] Int. Cl.⁶ .......................... B60C 29/00; F16K 15/20; F16K 31/46
[52] U.S. Cl. .......................... 137/231; 251/82; 251/293; 152/427
[58] Field of Search ..................... 137/223, 231; 251/82, 293; 152/427

[56] References Cited

U.S. PATENT DOCUMENTS

| 1,170,138 | 2/1916 | Bohne et al. | 251/293 X |
| 1,334,566 | 3/1920 | Steinmetz | 251/82 |
| 2,772,692 | 12/1956 | Russell | 251/82 X |
| 2,812,000 | 11/1957 | Trinca | 251/293 X |
| 3,598,361 | 8/1971 | Crowe | 251/293 X |
| 4,664,153 | 5/1987 | Bishop | 137/223 X |
| 5,125,625 | 6/1992 | Gooch, IV et al. | 251/82 X |

FOREIGN PATENT DOCUMENTS

| 331747 | 11/1903 | France | 251/82 |
| 2190 | 1/1904 | France | 137/223 |

Primary Examiner—John Rivell
Attorney, Agent, or Firm—Perman & Green

[57] ABSTRACT

A modified air valve construction is provided for use in combination with a modern bicycle wheel having a rim for mounting a tire and an inner tube within the tire. Since many modern rims include relatively deep radially inwardly extending fairings which encompass air valves of conventional length, in accordance with the invention, an air valve adapter is received through an inwardly facing hole in the rim and attaches to the original valve stem. The adapter can be operated to selectively open or lock the unmodified valve. A nozzle from a pump can, in turn, be connected to the adapter to inflate the inner tube.

12 Claims, 5 Drawing Sheets

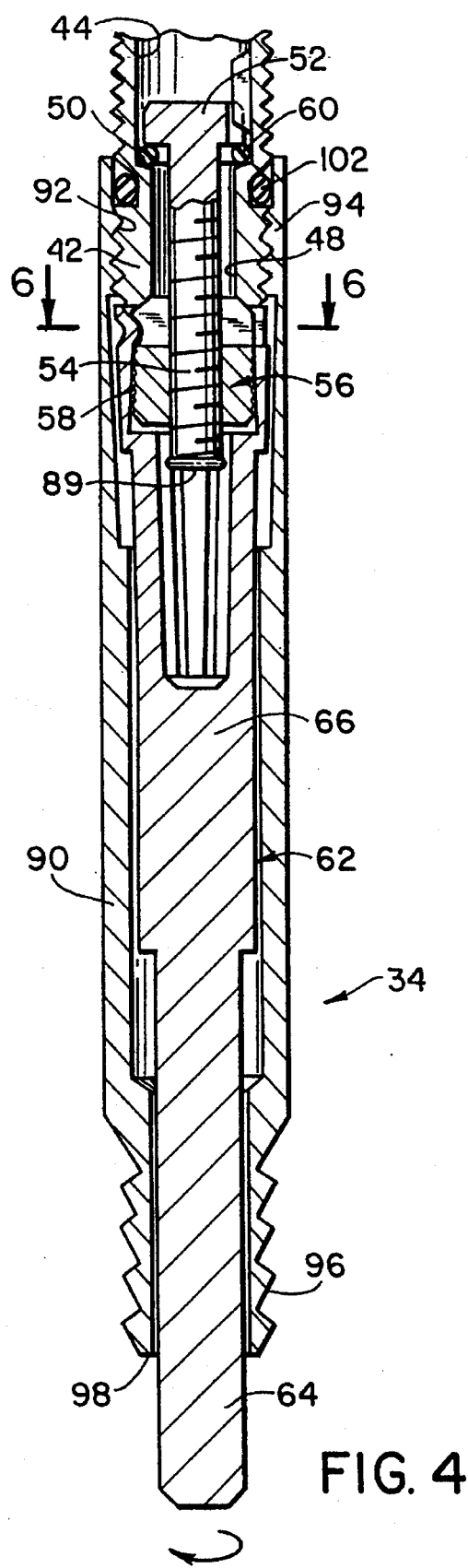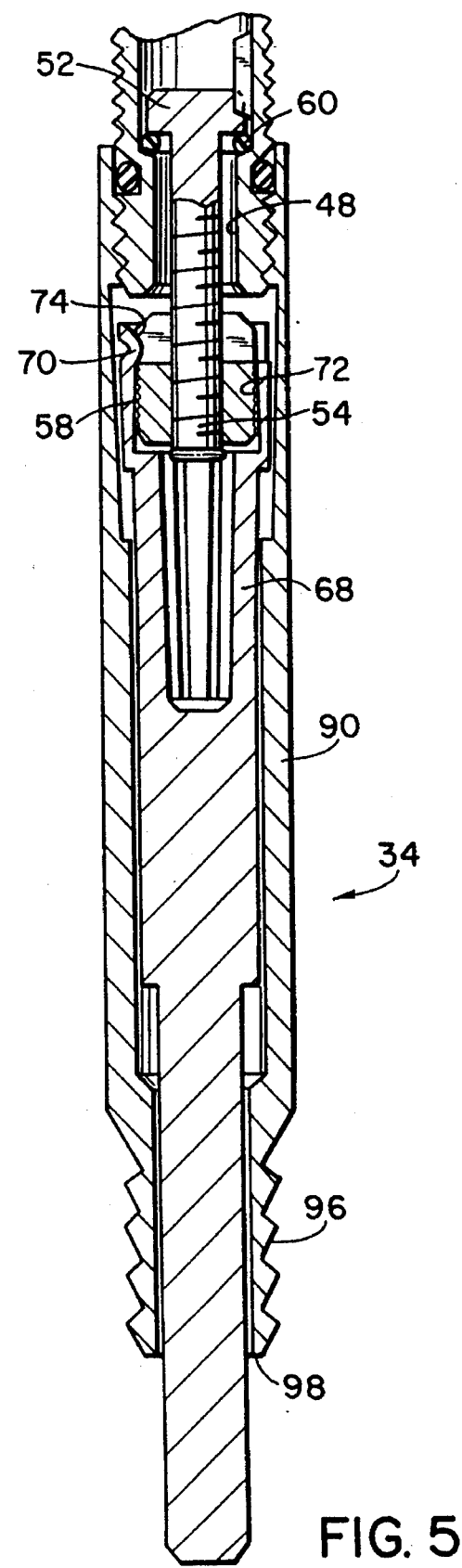
FIG. 4
FIG. 5

5,509,438

AIR VALVE ADAPTER

BACKGROUND OF THE INVENTION

1. Field of the Invention

The present invention relates generally to bicycle wheels and, more particularly, to an air valve adapter to enable operation of conventional bicycle tire air valves when used with rims for modern bicycle wheels which incorporate relatively deep radially inwardly extending fairings which encompass such air valves of conventional length.

2. Description of the Prior Art

In most known designs of high performance bicycle wheels, the rim is of a design which enables an air valve for an inner tube of a bicycle tire to project in a radial inward direction a sufficient distance to enable an operator to attach a nozzle from an air pump in order to inflate the tube. Alternatively, manipulating the air valve also enables an operator to deflate the inner tube should that be desired for any reason.

With the advent of more modern bicycles capable of ever higher speeds, it has become more and more common to streamline components wherever possible. One such component is the bicycle wheel. In this regard, it has been found desirable to deepen the wheel rim, that is, to increase its depth in a radial direction, proceeding from the tire toward the center of the wheel. Instead of the innermost surface of the rim being relatively blunt as in older designs, it is now often faired nearly to a point. In this condition, the fairing extends radially inwardly a sufficient distance that it, undesirably, encompasses air valves of conventional length, making pump attachment, valve-securing and air-release impossible. Known extenders to date do not allow valve manipulation, allowing leakage and making air release awkward. Such a design necessarily requires either a totally new re-sized valve or an adapter which would enable conventional valves to continue to be used with modern bicycle wheels.

It was in light of the prior art as just described that the present invention was conceived and has now been reduced to practice.

SUMMARY OF THE INVENTION

In accordance with the invention, a modified air valve construction is provided for use in combination with a modern bicycle wheel having a rim for mounting a tire and an inner tube within the tire. Since many modern rims include relatively deep radially inwardly extending fairings which encompass air valves of conventional length, in accordance with the invention, an air valve adapter is received through an inwardly facing hole in the rim and attaches to the original valve stem. The conventional valves do not have close-off springs, allowing air in, but depending upon internal air pressure for temporary sealing. As the pump is detached, if the securing nut is not secured, experience shows that the valve over time allows all the trapped interior air to escape, resulting in a "flat" tire, which is unacceptable to the average bike rider. The adapter can be operated to selectively open or lock the unmodified valve. A nozzle from a pump can, in turn, be connected to the adapter to inflate the inner tube. The adapter can also be used to deflate the inner tube should that be desired.

A primary object of the invention, then, is to provide an air valve adapter of a design which enables the continued use of conventional air valves without requiring a redesigned valve, where such a redesigned valve would likely be unsuitable for conventional wheels.

Another object of the invention is to provide an air valve adapter which can be easily and readily applied to the stem of a conventional air valve and operated in the same manner as the conventional air valve.

A further object of the invention is to provide an air valve adapter which is of simplified design (recognizing that geometrical constraints are severe), is of minimal diameter to pass through a minimal diameter hole, is sufficiently sturdy to withstand normal usage, uses conventional materials, and is of light weight. Any weight added to the screw stem of the valve will diminish its ability to close, for example, if the valve is nearest the road surface when pumping is performed to inflate the tire.

Other and further features, advantages, and benefits of the invention will become apparent in the following description taken in conjunction with the following drawings. It is to be understood that the foregoing general description and the following detailed description are exemplary and explanatory, but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

BRIEF DESCRIPTION OF THE DRAWINGS

FIG. 4 is a cross section view taken generally along line 4—4 in FIG. 2 and illustrating the air valve in a closed condition;

FIG. 5 is a cross section view, similar to FIG. 4, illustrating another position of the adapter of the invention, in a condition ready to accept air from a tire pump;

DETAILED DESCRIPTION OF THE PREFERRED EMBODIMENT

Figure 1:
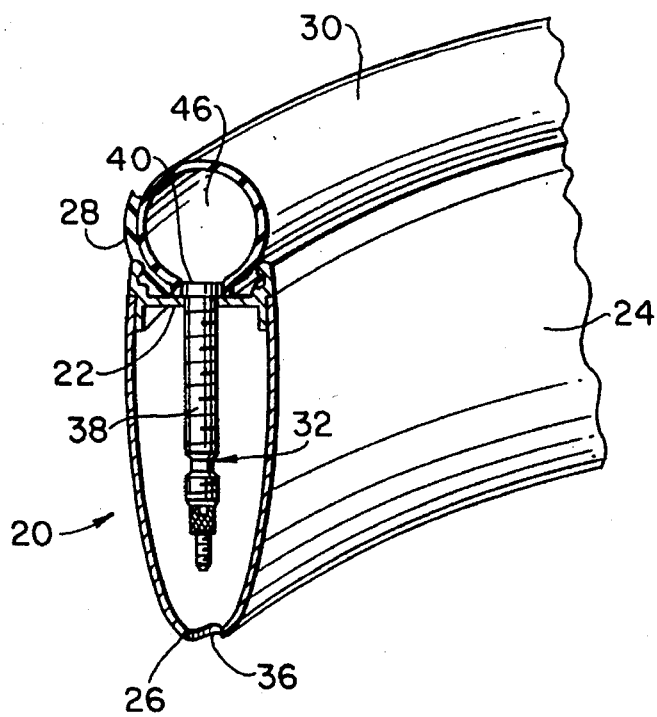
FIG. 1 is a detail perspective view, partly cut away and shown in section, of a conventional air valve used on a bicycle wheel having a modern faired rim.

Turn now to the drawings and, initially, to FIG. 1 which illustrates a modern streamlined rim 20 for a bicycle wheel. The rim 20 includes a circular rim hoop 22 and an integral streamlined fairing 24 which extends radially inwardly toward the center of the rim hoop such that it exhibits substantial depth, that is, distance between the rim hoop 22 and a relatively sharp extremity 26 distant from the hoop. The rim hoop 22 serves to support and retain thereon a tire 28 for the bicycle and an inner tube 30 contained within the tire. A conventional air valve 32 is illustrated in FIG. 1. Unfortunately, as can be readily seen, it is of insufficient length to project through and beyond the extremity 26 of the fairing 24 to enable it to receive the nozzle of the air pump intended to inflate the inner tube 30 in a known manner. More importantly, the locking and air release features requiring physical manipulation are totally inaccessible. For full utility, the user must be able to both push the stem assembly and rotate the clamping nut 56 of the air valve. It was to correct this situation that the present invention has been devised.

Figure 2:
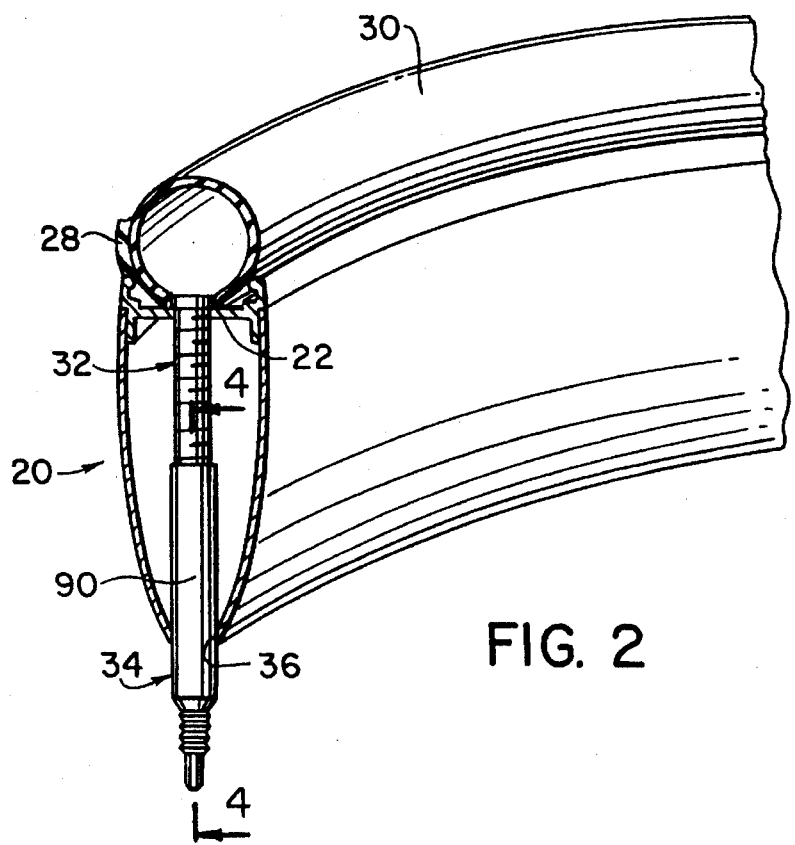
FIG. 2 is a detailed perspective view, similar to FIG. 1, but incorporating an air valve adapter embodying the present invention.

As can be seen in FIG. 2, an air valve adapter 34 embodying the invention is illustrated attached to the air valve 32 and received through an inwardly facing hole 36 in the fairing 24 of the rim 20.

The details of the air valve adapter 34 will now be described with particular attention to FIGS. 3–8.

The conventional air valve 32 includes a cylindrical housing 38 which is suitably sealingly attached at an outer end 40 to the inner tube 30 and extends radially inwardly to an inner end 42 remote from the outer end. The housing 38 defines a chamber 44 which is in fluid communication with the interior 46 of the inner tube 30. The housing 38 has a fill opening 48 at the inner end 42. A valve seat 50 is defined by a shoulder between the peripheral surface of the chamber 44 and the peripheral surface of the fill opening 48 and is located within the chamber 44.

A piston 52 within the chamber 44 is movable between an open position spaced from the valve seat 50 (FIG. 8) and a closed position (FIGS. 4 and 5) in engagement with the valve seat. In the former instance, the flow of air into and out of the interior 46 of the inner tube 30 as indicated by arrows 53 is enabled, while in a latter instance the flow of air into and out of the inner tube is prevented. An externally threaded piston rod 54 is integral with the piston 52 and extends through the fill opening 48 at the inner end 42. A clamping nut 56 having an outer peripheral surface 58 is threadedly received on the piston rod 54 in a region external of the housing 38. In order to assure a sealing relationship between the piston 52 and the valve seat 50, an O-ring or other suitable seal 60 may be provided between the piston and the valve seat.

Figure 9:
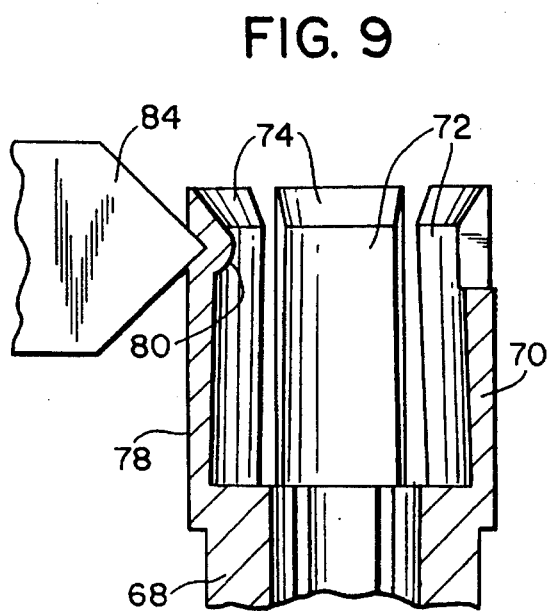
FIG. 9 is a detail cross sectional view of a component illustrated in FIGS. 3–5 and 8 and diagrammatically depicting an operation performed on the component.
Figure 6:
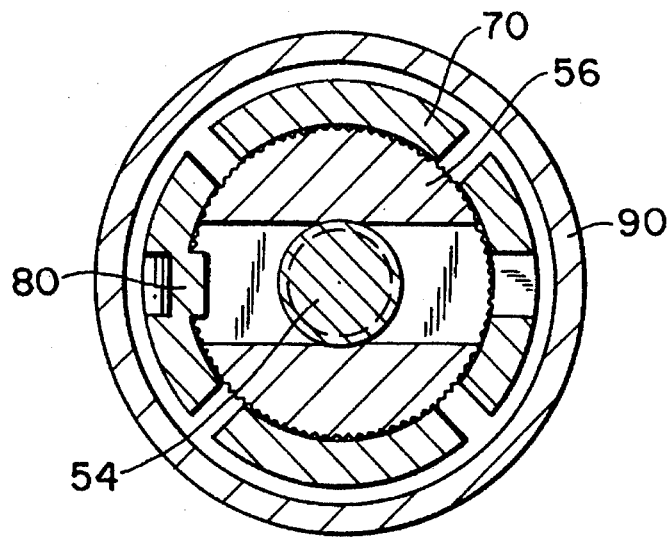
FIG. 6 is a cross section view taken generally along lines 6—6 in FIG. 4.
Figure 7:
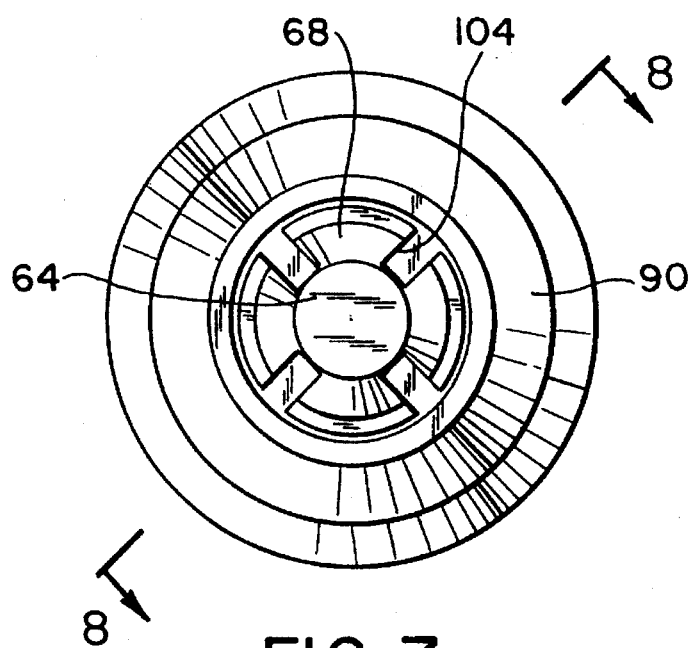
FIG. 7 is an end elevation view of FIGS. 4 and 5.

The construction of the air valve adapter 34 which was previously mentioned as being attachable to the conventional air valve 32 will now be described. The adapter 34 includes an elongated cylindrical body 62 having an outer peripheral surface 64 (FIG. 3) which extends between first and second ends 64, 66, respectively. As can be seen particularly well in FIGS. 4–6, the cylindrical body 62 is axially aligned with the housing 38 and the piston rod 54. A plurality of resilient cantilevered gripping fingers 68, integral with the cylindrical body 62, extend from circumferentially spaced locations at the second end 66 in directions which are generally parallel to its longitudinal axis. The gripping fingers 66 extend to gripper ends 70 which are distant from the second end 66. Each of the gripper ends includes a contoured gripping surface 72 (FIG. 9) shaped to substantially conform to the outer peripheral surface 58 of the clamping nut 56 and a cam surface 74 adjacent the gripping surface 72.

Figure 3:
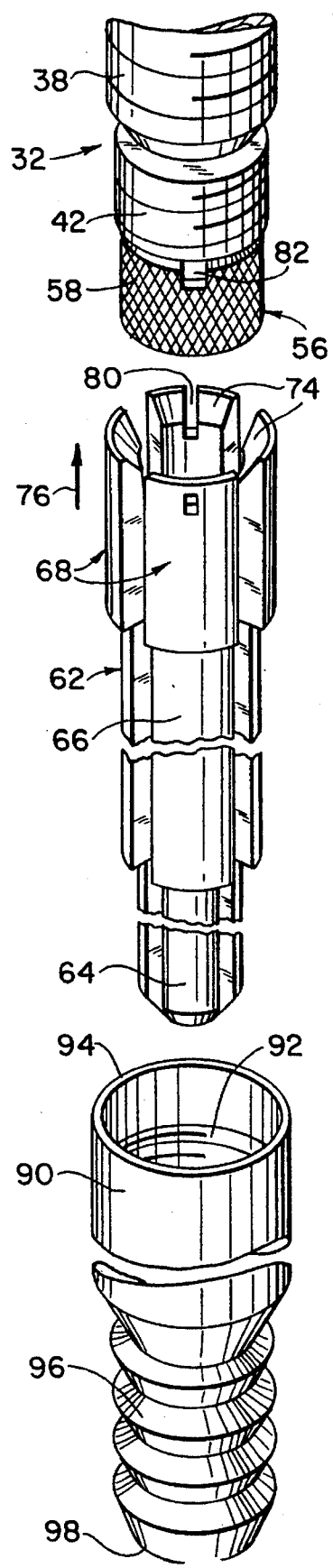
FIG. 3 is an exploded perspective view of certain components illustrated in FIG. 2.

With particular reference to FIG. 3, it can be seen that as the cylindrical body 62 of the air valve adapter 34 is moved in the direction of an arrow 76 toward making engagement with the conventional air valve 32, the cam surfaces 74 on the gripping fingers 68 come to engage the clamping nut 56. This movement causes the gripper ends 70 of the gripping fingers 68 to deflect radially outwardly from the longitudinal axis of the cylindrical body 62 until the gripping surfaces 72 are extensive with and biased into mating engagement with the outer peripheral surface 58 of the clamping nut 56.

One final desirable optional expedient for assuring rotary drive engagement between the gripper ends 70 and the clamping nut 56 resides in the provision of one or more radially extending projections 80 (see especially FIGS. 3 and 9) which may be formed as by a tool 84 applied to the gripper ends 70 adjacent to the cam surfaces 74. Each projection 80 is directed radially inwardly from the gripping surface 72 of those gripper ends 70 so modified. The projections 80 are matingly receivable in laterally facing openings 82 formed in the clamping nut 56. Typically, clamping nuts 56 of conventional air valves 32 have a pair of diametrically opposed lateral openings 82 such that it would be possible for the cylindrical body 62 to similarly be formed with a pair of diametrically opposed projections 80. However, since air pressure must be provided to service at least one of the openings 82 as will be explained, it is preferable that only one projection 80 be provided so as to leave the other opening 82 completely unobstructed for air flow. When the body 62 is first advanced into engagement with the conventional air valve 32, it is likely that the projection 80 will not be axially aligned with a lateral opening 82. However, manual rotation of the body 62 on its longitudinal axis will readily cause the projection to locate and engage with one of the lateral openings. Thus, these openings 82, originally intended as air channels only, are utilized in the present invention to provide an additional keyed wrenching action. With the projection 80 thereby in mating engagement with an associated lateral opening 82, rotation of the body 62 about its longitudinal axis is thereby positively imparted to the clamping nut 56.

When the cylindrical body 62 is first attached to the conventional air valve 32 in the manner just described, it is assumed for purposes of this description that the conventional air valve 32 is closed as illustrated in FIG. 4, preventing flow of air into and out of the inner tube 30. However, it will be understood that the clamping nut 56 need not be in a clamping condition. That is, it may be in an unclamped, yet sealed, condition as illustrated in FIG. 5. In FIG. 5, while the piston 52 is mechanically free to become unseated from the seal 60, the air pressure within the inner tube 30 continues to hold it closed. Once the cylindrical body 62 is joined with the conventional air valve 32 as indicated in FIG. 4, the end 64 can be manually rotated about its longitudinal axis in the manner indicated by arcuate arrow 86. With rotation of the end 64 of the body 62 as indicated by arrow 86, the nut 56 is advanced along the threaded piston rod 54 in a direction away from the piston 52 just enough to allow air to pass between it and seal 70. The piston rod 54 is prevented from rotating on its longitudinal axis by means of suitable structure, for example, by means of an anti-rotation key 87 and cooperating key slot 88 in the existing valve. It will also be appreciated that the clamping nut 56 is prevented from travelling out by engagement with the piston rod 54 by means of a mashed extremity thereon.

In order to inflate the inner tube 30 an elongated tubular cover 90 is provided which substantially encapsulates the cylindrical body 62. The tubular cover 90 is internally threaded at 92 at a mounting end 94 for attachment to the inner end 42 of the cylindrical housing 38. Adjacent a free end 98 opposite the mounting end 94, the tubular cover 90 has a plurality of annular serrations 96. The end 64 of the body 62, which serves as a handle as previously described, freely projects through the opening at the free end 98.

While the body 62 and cover 90 are physically two separate components, it is intended that they be provided and used as a loose-fitting, but self-retained pair. To this end, they would be assembled such that the first end 64 of the body 62 is introduced into and through the mounting end 94 of the cover 90. With continued relative movement between the body 62 and cover 90, the gripper ends 70 are depressed, that is, biased inwardly toward a center line of the body 62 so as to clear, radially, the end 94 after which they spring radially outwardly. When this has occurred, the body 62 can no longer be readily separated from the cover 90 because of an internal shoulder 99 of the cover.

Pressurized air can be introduced into the inner tube 30 when the nozzle 100 (FIG. 8) of a suitable air pump is attached in a known manner to the free end 98 in a known manner. When the inner tube 30 has been inflated to the proper pressure, the nozzle from the air pump is removed from the free end 98. The end 64 of the body 62 may be rotated (at leisure, since internal tire pressure serves to adequately seal against blow-back until clamping nut 56 can be secured) in a direction opposite the arrow 86 (FIG. 4) until the piston 52 once again engages the seal 60 and valve seat 50. Removal of the paired assembly of the body 62 and cover 90 is automatically achieved when the cover is unscrewed from the inner end 42 and the assembly pulled free of the clamping nut 56, if necessary. The air valve adapter 34 can subsequently be re-used with the same inner tube 30 or can be attached to another inner tube, possibly a replacement inner tube, if desired. A suitable seal 102 may also be interposed between the tubular cover 90 and the cylindrical body 62 to assure that air flow is contained within the adapter 34.

Figure 8:
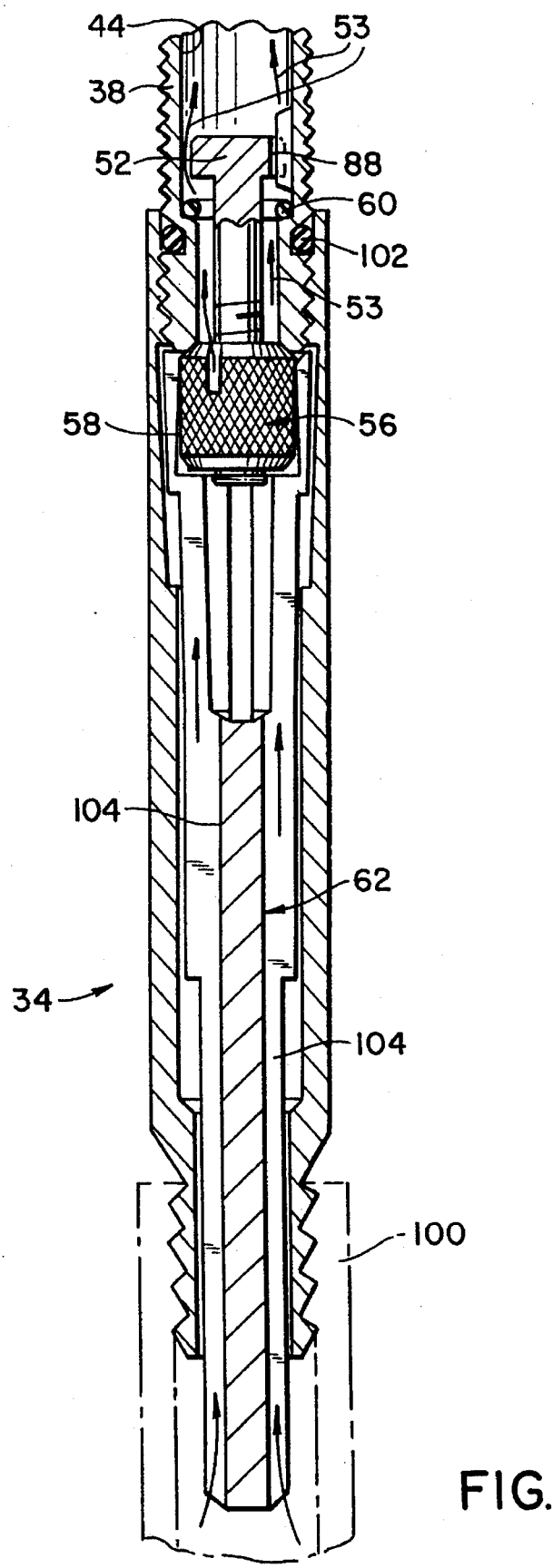
FIG. 8 is a cross section view taken generally along line 8—8 in FIG. 7.

In order to assure the free flow of air through the adapter 34 when the air valve 32 is open in the manner depicted in FIG. 8, the body 62 is preferably provided with a plurality of circumferentially spaced, longitudinally extending grooves 104 which communicate with the spaces between adjacent gripping fingers 68.

To allow the tire inner tube to deflate, first end 64 is rotated in a direction opposite arcuate arrow 86 any desired amount, up to the extreme allowed. Then, first end 64 can be pushed axially, as desired. Failure to push on the first end 64 to unseat the piston 52 will normally stop outflow of air from the inner tube 30. This condition can then be secured by rotating first end 64 in the direction of the arcuate arrow 86.

Figure 10:
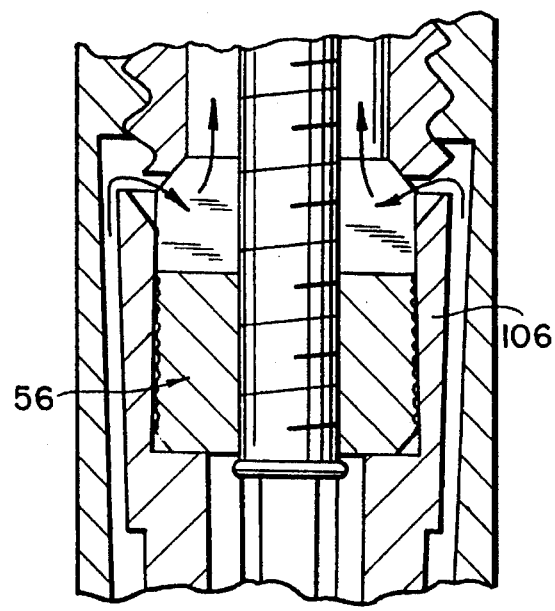
FIG. 10 is an enlarged detail cross section view of a portion of FIG. 5 illustrating a modified construction thereof.

Another embodiment of the invention may be seen in FIG. 10. In this instance, gripping fingers 106, shorter in length than the gripping fingers 68 may be employed. The gripping fingers 106 lack the projection 80 and only engage the clamping nut 56 in a frictional manner. However, the frictional engagement between the gripping fingers 106 and the clamping nut 56 should be sufficient for operation in the manner already described.

While a preferred embodiment of the invention has been disclosed in detail it should be understood by those skilled in the art that various other modifications may be made to the illustrated embodiment without departing from the scope of the invention as described in the specification and defined in the appended claims.

What is claimed is:

1. An air valve adapter enabling operational access to a remotely located valve stem means of a bicycle inner tube which would not otherwise be accessible, said adapter comprising:

an elongated cylindrical body extending between first and second ends and having a longitudinal axis;

gripper means adjacent said second end selectively attachable to the remotely located valve stem means for releasably engaging an outer peripheral surface thereof, said gripper means including a plurality of resilient cantilevered gripping fingers integral with said elongated body extending from circumferentially spaced locations at said second end in directions generally parallel to said longitudinal axis, said gripping fingers extending to gripper ends distant from said second end; and gripper operating means adjacent said first end, when attached to the remotely located valve stem means, for actuating the valve stem means for movement between a first locked position to prevent flow of air into and out of the inner tube and a second position distant from said first position to enable the valve stem means to move to an open position enabling flow of air into and out of the inner tube.

2. An air valve adapter as set forth in claim 1 wherein said gripper ends include:

contoured gripping surfaces shaped to substantially conform to the outer peripheral surface of the valve stem means; and cam surfaces adjacent said gripping surfaces engageable with the valve stem means as said air valve adapter is moved axially toward the valve stem means in axial alignment therewith for deflecting said gripping ends radially outwardly from said longitudinal axis until said gripping surfaces are coextensive with and biased into mating engagement with the outer peripheral surface of the valve stem means whereby rotation of said gripper means about said longitudinal axis imparted to the valve stem means in one direction is effective to open the valve stem means and whereby rotation of said gripper means toward an extreme in the opposite direction is effective to lock the valve stem means in a closed position.

3. An air valve adapter as set forth in claim 2 wherein the valve stem means has at least one laterally facing opening in its outer peripheral surface; and wherein at least one of said gripping surfaces includes a radially extending projection receivable in the laterally facing opening whereby rotation of said gripper means about said longitudinal axis is positively imparted to the valve stem means.

4. In combination with a bicycle wheel having a rim for mounting a tire and an inner tube within said tire, said inner tube having a radially inwardly extending air valve with a valve stem means having an outer peripheral surface, said rim including a radially inwardly extending fairing encompassing said air valve, an air valve adapter for reception through an inwardly facing hole in said rim comprising:

an elongated cylindrical body extending between first and second ends and having a longitudinal axis;

gripper means adjacent said second end selectively attachable to said valve stem means for releasably engaging said outer peripheral surface thereof, said gripper means including a plurality of resilient cantilevered gripping fingers integral with said elongated body extending from circumferentially spaced locations at said second end in directions generally parallel to said longitudinal axis, said gripping fingers extending to gripper ends distant from said second end; and gripper operating means adjacent said first end for actuating said valve stem means, when attached to said valve stem means from a location external of said fairing, for movement between a first locked position to prevent flow of air into and out of the inner tube and a second position distant from said first position to enable said valve stem means to move to an open position enabling flow of air into and out of the inner tube.

5. An air valve adapter as set forth in claim 4 wherein said gripper ends include:

contoured gripping surfaces shaped to substantially conform to said outer peripheral surface of said valve stem means; and cam surfaces adjacent said gripping surfaces engageable with said valve stem means as said air valve adapter is moved axially toward said valve stem means in axial alignment therewith for deflecting said gripping ends radially outwardly from said longitudinal axis until said gripping surfaces are coextensive with and biased into mating engagement with said outer peripheral surface of said valve stem means whereby rotation of said gripper means about said longitudinal axis imparted to said valve stem means in one direction is effective to unlock the valve stem means and whereby rotation of said gripper means toward an extreme in the opposite direction is effective to lock the valve stem means.

6. An air valve adapter as set forth in claim 5 wherein said valve stem means has at least one laterally facing opening in said outer peripheral surface thereof; and wherein at least one of said gripping surfaces includes a radially extending projection receivable in the laterally facing opening whereby rotation of said gripper means about said longitudinal axis is positively imparted to said valve stem means.

7. An elongated air valve attached to an inner tube of a bicycle tire for selectively inflating and deflating the tire comprising:

a cylindrical housing attached at an outer end to the inner tube and extending radially inwardly to an inner end remote from said outer end, said housing defining a chamber which is in fluid communication with the interior of the inner tube, said housing having a fill opening at said inner end and a valve seat within said chamber adjacent said inner end;

position spaced from said valve seat enabling the flow of air into and out of the inner tube and a locked position in engagement with said valve seat preventing the flow of air into and out of the inner tube;

an externally threaded piston rod integral with said piston and extending through the fill opening at said inner end;

key means interposed between said piston and said housing for restraining said piston rod against rotation relative to said housing; and a clamping nut having an outer peripheral surface threadedly received on said piston rod external of said housing, said clamping nut being rotatable on said piston rod between a first position engaged with said inner end of said housing and holding said piston in said locked position and a second position distant from said first position to enable said piston to move to said open position out of engagement with said valve seat;

an air valve adapter for selective attachment to said clamping nut including:

an elongated cylindrical body having an outer peripheral surface and extending between first and second ends and having a longitudinal axis; and gripper means adjacent said second end selectively attachable to said clamping nut for releasably engaging said outer peripheral surface thereof, said gripper means including a plurality of resilient cantilevered gripping fingers integral with said elongated body extending from circumferentially spaced locations at said second end in directions generally parallel to said longitudinal axis, said gripping fingers extending to gripper ends distant from said second end; and gripper operating means adjacent said first end, when attached to said clamping nut, enabling rotation of said adjustment nut on said piston rod to move said piston between said first and second positions.

8. An air valve adapter as set forth in claim 7 wherein said gripper ends include:

contoured gripping surfaces shaped to substantially conform to said outer peripheral surface of said clamping nut; and cam surfaces adjacent said gripping surfaces engageable with said clamping nut as said air valve adapter is moved axially toward said clamping nut in axial alignment therewith for deflecting said gripping ends radially outwardly from said longitudinal axis until said gripping surfaces are coextensive with and biased into mating engagement with said outer peripheral surface of said clamping nut whereby rotation of said gripper means about said longitudinal axis imparted to said clamping nut toward an extreme in one direction is effective to unlock said air valve and whereby rotation of said gripper means toward an extreme in the opposite direction is effective to lock said air valve.

9. An air valve adapter as set forth in claim 8 wherein said clamping nut has at least one laterally facing opening in its outer peripheral surface; and wherein at least one of said gripping surfaces includes a radially extending projection receivable in the laterally facing opening whereby rotation of said gripper means about said longitudinal axis is positively imparted to said clamping nut.

10. An air valve adapter as set forth in claim 9 including:

seal means interposed between said piston and said valve seat for positively preventing flow of air through the fill opening when said piston engaged therewith holds said seal means firmly against said valve seat.

11. An air valve adapter as set forth in claim 9 wherein said cylindrical housing is externally threaded adjacent said outer end; and wherein said gripper operating means is an elongated handle member; and including:

an elongated tubular cover substantially encapsulating said air valve adapter and being internally threaded at a mounting end for threaded attachment to said inner end of said cylindrical housing and having a free end through which said elongated handle member of said gripper operating means freely projects.

12. An air valve adapter as set forth in claim 11 wherein said tubular cover has an inner surface which closely conforms to said outer peripheral surface of said cylindrical body, said outer peripheral surface of said cylindrical body including a plurality of circumferentially spaced, longitudinally extending, grooves to provide a substantially unrestricted path for the flow of ambient air into and out of the inner tube when said piston is in the open position.

\* \* \* \* \*